United States Patent [19]

Kaun et al.

[11] 4,386,019

[45] May 31, 1983

[54] METHOD OF MAKING ELECTRODES FOR ELECTROCHEMICAL CELL

[75] Inventors: Thomas D. Kaun, New Lenox; Dennis J. Kilsdonk, Joliet, both of Ill.

[73] Assignee: The United States of America as represented by the United States Department of Energy, Washington, D.C.

[21] Appl. No.: 287,856

[22] Filed: Jul. 29, 1981

[51] Int. Cl.$^3$ .............................................. H01B 1/04
[52] U.S. Cl. ..................................... 252/503; 252/506; 252/508; 252/509; 252/512; 252/513; 252/518; 252/519; 252/521; 252/182.1; 429/103; 429/218; 429/221
[58] Field of Search ............... 252/503, 502, 512, 513, 252/518, 519, 521, 182.1; 29/623.1; 264/104, 105; 141/1.1, 32; 429/198, 199, 218, 221, 226, 232, 103; 75/212, 214, 124, 138; 204/24, 291, 292, 293, 294

[56] References Cited

U.S. PATENT DOCUMENTS

| | | | |
|---|---|---|---|
| 3,607,413 | 9/1971 | Buzzelli | 204/39 |
| 3,957,532 | 5/1976 | Settle et al. | 264/111 |
| 4,011,372 | 3/1977 | Tomczuk | 429/218 |
| 4,011,374 | 3/1977 | Kaun | 252/182.1 |
| 4,049,027 | 9/1977 | Seagier | 252/182.1 |
| 4,158,720 | 6/1979 | Kaun | 428/567 |
| 4,175,055 | 11/1979 | Goller et al. | 252/182.1 |
| 4,177,157 | 12/1979 | Adams | 252/182.1 |
| 4,177,159 | 12/1979 | Singer | 252/182.1 |
| 4,206,276 | 6/1980 | Basu et al. | 429/218 |
| 4,285,828 | 8/1981 | Knödler et al. | 204/293 X |
| 4,297,231 | 10/1981 | Kohara et al. | 264/105 X |

*Primary Examiner*—J. L. Barr

[57] ABSTRACT

A method of making an electrode for an electrochemical cell in which particulate electrode-active material is mixed with a liquid organic carrier chemically inert with respect to the electrode-active material, mixing the liquid carrier to form an extrudable slurry. The liquid carrier is present in an amount of from about 10 to about 50 percent by volume of the slurry, and then the carrier is removed from the slurry leaving the electrode-active material.

18 Claims, No Drawings

METHOD OF MAKING ELECTRODES FOR ELECTROCHEMICAL CELL

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to a method of making electrodes for use in secondary electrochemical cells. More particularly, it concerns a method of making a negative electrode including a lithium-aluminum alloy and an additive which exhibits an increased loading density and is independent of the ductility or brittleness of the electrode-active material.

A substantial amount of work has been done in the development of high-temperature, secondary electrochemical cells. Positive electrodes for these cells have included chalcogens such as sulfur, oxygen, selenium or tellurium as well as their transition metal chalcogenides. Positive electrode materials such as the sulfides of iron, cobalt, nickel and copper are of current interest.

In high temperature cells, current flow between electrodes often is transmitted by molten electrolytic salt. Particularly useful salts include compositions of the alkali metal halides and/or the alkaline earth metal halides ordinarily incorporating a salt of the negative electrode reactant metal, e.g. lithium. In cells operating at moderate temperatures, aqueous and organic base electrolytes are permissible and these also can include cations of the negative electrode metal.

Alkali metals such as lithium, sodium, potassium or alkaline earth metals including calcium, magnesium, etc. and alloys of these materials are contemplated as negative electrode reactants. Alloys of these materials such as lithium-aluminum, lithium-silicon, lithium-magnesium, calcium-magnesium, calcium-aluminum, calcium-silicon and magnesium-aluminium have been investigated to maintain the negative electrode in solid form and thereby improve retention of the active material at high cell operating temperatures.

One manner of preparing the electrode material is to first form a molten alloy of iron and aluminum. The melt is formed at a temperature above the melting point of aluminum but below the melting point of iron, and temperatures of about 1200° C. or above are satisfactory. The melt is solidified and comminuted to particles of aluminum-iron alloy in the specified proportions. The particles of alloy are integrated into a porous electrically conductive structure. This can be achieved by compacting the particles together with electrolyte, by vibrating or otherwise distributing the particles into a porous electrically conductive substrate or by bonding the particles with a carbonaceous, thermosetting material to form a porous electrically conductive substrate.

Other metallurgical techniques can also be employed to provide alloy compositions. The materials may be melted together and cast or extruded into wire form. Extruded wires or elongated particles of the iron-aluminum alloy can be entangled into a porous mass and compacted. Also, a mass of wires or particles can be sintered to integrate them into a porous substrate in the desired constituent proportions. In one other method, foam metals of the preferred composition can be provided using conventional techniques such as by agitating a molten alloy into a foam by quick solidification.

Cold and hot pressing are also used to fabricate electrodes. Cold pressing depends upon material ductility to obtain desired electrode loading-density. Electrodes having greater than about 48 atom percent lithium-aluminum alloy cannot be made by cold pressing because the lithium alloy particles are too brittle. Cold pressing is generally limited to flat, rectangularly shaped electrodes, whereas advanced electrode design may require annular or other shapes.

The present inventors have found that forming a slurry of a carrier which is chemically inert with respect to the electrode-active material and particulate electrode-active material to a consistency or viscosity such that the slurry is extrudable, that is somewhat like wet sand, results in unexpected high loading densities and the ability to formulate electrodes of complicated shapes.

SUMMARY OF THE INVENTION

It is an object of the present invention to provide a method of making electrodes for a secondary electrochemical cell. It is a further object to provide a method for making a negative electrode which exhibits increased packing densities and facilitates fabrication of electrodes of complex shapes while avoiding problems previously encountered.

It is another object to provide a method of making electrodes which is lower in cost.

In accordance with the present invention, a method of making an electrode for an electrochemical cell comprising, providing particulate electrode-active material, providing a liquid organic carrier chemically inert with respect to the electrode-active material, mixing the liquid carrier and the particulate electrode-active material to form an extrudable slurry, the liquid carrier being present in an amount of from about 10 to about 50 percent by volume of the slurry, and removing the carrier from the slurry leaving the electrode-active material.

In a more specific aspect of the invention, the method of making a negative electrode comprises providing a particulate mixture of a lithium-aluminum alloy and an electrolyte and a material selected from graphitized carbon, an aluminum-iron alloy or mixtures thereof, the lithium-aluminum alloy being present in the range of from about 45 to about 80 percent by volume of the negative electrode, the electrolyte being present in an amount not less than about 10 percent by volume of the negative electrode, the graphitized carbon being present in the range of from about 1 to about 10 percent by volume of the negative electrode, the aluminum-iron alloy being present in the range of from about 3 to about 10 percent by volume of the negative electrode, providing a liquid organic carrier chemically inert with respect to said lithium-aluminum alloy, mixing the liquid carrier and the particulate mixture to form an extrudable slurry, the liquid carrier being present in an amount of from about 10 to about 50 percent by volume of the slurry, forming the slurry into a predetermined shape, and removing the liquid carrier from the slurry thereby to provide a negative electrode having a predetermined shape for an electrochemical cell.

The method of the present invention is useful in fabricating negative and positive electrodes but will be described in connection with production of a negative electrode formed of a lithium-aluminum alloy, electrolyte and an additive of graphitized carbon and/or Raney iron.

Graphitized carbon is particulate carbon which is heated in a protective atmosphere to a temperature in the range of from about 1000° C. to about 2000° C. in order to initiate the change to graphite structure. "Graphitized carbon" as used in this application means carbon which has been heated within the aforesaid temperature range; however, higher heating temperatures are not excluded but are unnecessary. Graphitized carbon as used herein does not require that the carbon be entirely graphitic.

Where carbon is added to the negative electrode, it is preferred that the carbon be present in the range of from about 1 to about 10 volume percent of the negative electrode. If the graphitized carbon is present in less than about 1 percent by volume of the negative electrode, then there is no beneficial effect; however, if the graphitized carbon is present in an amount greater than about 10 percent by volume of the negative electrode then there is too much inert weight in the electrode which displaces the electrolyte, thereby decreasing the efficiency of the electrode and the cell. It is preferred that the graphitized carbon be present in the range of from about 3 to about 7 percent by volume of the negative electrode.

Where Raney iron ($Al_5Fe_2$) is used in place of the graphitized carbon, then it is preferred that the Raney iron be present in the range of from about 3 to about 10 percent by volume of the negative electrode. If the Raney iron is present in an amount less than about 3 percent by weight of the negative electrode, then there is insufficient additive to obtain the objects of the present invention whereas if the Raney iron is present in an amount greater than about 10 percent by volume of the negative electrode, then the Raney iron will displace too much electrolyte and the cell will diminish in efficiency due to the excessive inert material present.

The negative electrode described herein contains a lithium-aluminum alloy present in the range of from about 45 to about 80 percent by volume of the negative electrode and an additive up to about 10 percent by volume of the negative electrode with the remainder being electrolyte, which may be a salt containing a lithium halide such as the eutectic mixture of lithium chloride and potassium chloride. It can be seen that the electrolyte should never be less than about 10 percent by volume of the electrode. If the lithium-aluminum alloy is present in an amount less than about 45 percent by volume of the negative electrode, then a high energy cell is not obtained, whereas if the lithium-aluminum alloy is present in an amount greater than about 80 volume percent of the negative electrode, then there is insufficient room for an electrolyte and the additive. If there is less than 10 percent by volume of the electrolyte in the negative electrode, then the electrode will be sluggish and during operation of the electrochemical cell expand to obtain electrolyte, thereby disturbing the geometric configuration of the cell.

DETAILED DESCRIPTION OF THE INVENTION

In the past, negative electrode materials were prepared by various metallurgical techniques such as that disclosed in U.S. Pat. No. 4,158,720 issued June 19, 1979, to Kaun assigned to the assignee of the present invention, the disclosure of which is incorporated herein by reference. In that patent, the negative electrode was prepared by forming a molten alloy of iron and aluminum. The melt was formed at a temperature above the melting point of aluminum but below the melting point of iron. For the alloys contemplated in that patent, temperatures of 1200° C. or above were satisfactory. The melt was solidified and comminuted to particles of aluminum-iron alloy in the specified proportions. Thereafter, the alloy particles were integrated into a porous, electrically conductive substrate. This was achieved by compacting the particles together with a powdered electrolyte by vibrating or otherwise distributing the particles into a porous electrically substrate or by bonding the particles with a combination, thermal setting material to form a porous electrically conductive substrate. Other metallurgical techniques such as casting or extruding are also discussed.

The preferred method of making the negative electrode of this invention involves forming a slurry of the lithium-aluminum particles in a carrier chemically inert to lithium alloys such as dry petroleum ether, toluene, kerosene, or the like such that the resultant slurry is a spreadable and extrudable paste. The preferred amount of organic carrier is about 30 percent by volume; however, the carrier may be present in an amount up to 50 volume percent or be as low as 10 volume percent, depending on particle size and desired viscosity.

If the inert carrier is present in an amount greater than 50 volume percent, then the slurry becomes too runny and does not retain its shape upon extrusion and also the amount of heat required to drive off the solvent evaporation is greater and handling costs are greater. On the other hand, if less than about 10 percent by volume inert carrier is used to form the slurry, then the close packing and protective nature of the carrier is not obtained, and the method is not advantageous.

By selecting an inert carrier such as petroleum based liquids such as toluene, kerosene, mineral spirits and the like, several benefits are obtained. It has been found that in the slurry, a closer particle packing density is obtained when compared to dry powder packing, the method most commonly used to fabricate electrodes of the present type. Because the lithium-aluminum alloy particles are irregularly shaped and the carrier apparently provides some lubricating properties, the lithium-aluminum particles pack more densely than dry powder packing. Typically, lithium-aluminum dry packing results in 50 percent of theoretical density to give a loading density of about 0.7 amp-hours/cc which is marginal for producing high-specific-energy cells. The aforesaid inert hydrocarbon slurry technique enables a 0.9 amp-hour/cc loading density which is well suited for high-specific-energy cells. This technique gives loading densities about equal to the cold pressed lithium-aluminum electrode loading densities.

In addition to producing comparable electrode loading density to cold pressing, the slurry electrode fabrication technique provides considerable advantage in that the slurry technique is not limited to flat rectangular shaped electrodes, as is cold pressing. When the slurry is extrudable it may be extruded to conform to advanced current collector design with irregularly shaped electrode terminals. This technique is not available when using cold pressing. For instance, cylindrical or annularly shaped electrodes can be formed by means of an extrudable slurry. In addition, the slurry technique accommodates active material which is very brittle, whereas cold pressing depends on material ductility to obtain the desired electrode loading density. Electrodes of greater than 48 atom percent lithium-aluminum cannot be made by cold pressing because the lithium alloy particles are too brittle. However, the slurry technique does not depend on material ductility to obtain the desired electrode shape and, in addition, does not develop stresses within the electrode of the type that have resulted in bowing and warping of cold pressed electrodes.

A still further benefit of the slurry technique is that room temperature extrusion is possible because the inert petroleum carrier provides sufficient protection to allow the extrusion to take place under normal atmosphere conditions as opposed to the protective atmosphere which is now required for the dry packing technique.

The inventive method is hereafter described in connection with an improved electrode composition disclosed in co-pending application Ser. No. 287,857, filed July 29, 1981, by Thomas D. Kaun and assigned to the assignee hereof, which composition includes a lithium-aluminum alloy along with an additive in sufficient quantities to impart increased lithium alloy utilization and relatively stability and improved cell capacity during repeated deep discharge cycles.

The additives which may be used in the negative electrode are from the class consisting of graphitized carbon, as previously defined, Raney iron or mixtures of graphitized carbon and Raney iron. Where the additive is graphitized carbon, it should be present in the range of from about 1 percent to about 10 percent by volume of the negative electrode and where the additive is Raney iron, the aluminum-iron intermetallic $Al_5Fe_2$, then it should be at least 3 to about 10 percent by volume of the negative electrode. Effective mixtures of graphitized carbon and Raney iron may be used in lieu of either the Raney iron or the graphitized carbon and the minimum amounts depend on the ratio of graphitized carbon to Raney iron, which is within the skill of the art.

Lithium in the range of about 5 to about 50 atom percent is added by direct contact or by electro-deposition into the aluminum to form the lithium-aluminum alloy. The lithium concentration is limited by its propensity to form molten phases with the alloy components at high temperatures and at high lithium concentrations. Fifty atom percent lithium is selected as a practical limit for cells operating in the 350° C. to 550° C. temperature range suitable for molten electrolytes. Higher lithium concentrations may be selected for cells capable of operating at lower temperatures such as with molten salt eutectics having low melting points or with aqueous or organic-based electrolytes containing lithium ions. The use of an additive selected from the class consisting of graphitized carbon, as hereinbefore defined, or Raney iron or mixtures thereof provide lithium alloy utilization of about 80 to 85 percent and stable capacity. Increased capacities of up to about 40 percent compared to lithium-aluminum negative electrode without the additive have been observed.

A test cell was constructed using the inventive slurry method hereinbefore described to produce a negative electrode having 49 atom percent lithium in the lithium-aluminum alloy, the alloy being present in an amount equal to 87 percent by volume of the negative electrode. Also included in the electrode was 3 volume percent graphitized carbon powder. The graphitized carbon powder used preferably has a particle size in the range of from about +325 to about −200 U.S. Mesh Series, and if Raney iron ($Al_5Fe_2$) is used as an additive, then the Raney iron should preferably have a particle size of from about +325 to about −100 U.S. Mesh Series.

A negative electrode having a 92.3 weight percent lithium-aluminum alloy and 7.7 weight percent graphitized carbon had 65 amp-hours of lithium alloy capacity vs. 120 amp-hours of iron sulfide capacity in the positive electrode, whereby the lithium alloy electrode was the limiting factor of the cell couple. The lithium-aluminum electrode with the graphitized carbon additive exhibited a loading density of about 0.9 amp-hours/cc and about 40 percent increased capacity compared to a lithium-aluminum negative electrode having no additive material. This electrode is well suited for a high-specific-energy cell. A negative electrode of lithium-aluminum with a 5 volume percent Raney iron ($Al_5Fe_2$) additive, after 550 cycles, had better than 98+ percent coulombic efficiency and with about 0.027 percent capacity decline rate. Both of these electrodes were made with the slurry method utilizing about 30 volume percent dry toluene as the carrier.

Examination of the cell using the graphitized carbon electrode after 186 cycles determined it had a 99 percent coulombic efficiency. Although some areas of agglomeration was seen at the electrode center, the graphitized carbon powder tended to break up the densified area, and further, each carbon particle retained an electrolyte film, whereby these areas were electrochemically active. No lithium-aluminum carbon phase was found in the cell, whereby it is assumed that the carbon remained discrete. Not only did the graphitized carbon electrode have a 40 percent improved capacity compared to similar electrodes without graphitized carbon but the capacity did not decline during deep discharge cycles and unexpectedly increased at the freeze-thaw cycle.

The present method is a significant improvement with respect to previous methods of making negative electrodes which incorporated various resins as binders since the chemicals in resin binders tend to react with the lithium-aluminum at elevated temperatures to diminish the electrochemical capacity of the negative electrode. Typically, the binder resins evolve water, hydrogen, oxygen, nitrogen, methane and other components during pyrolysis which react with the lithium in the negative electrode forming the oxides, the hydroxides and the nitrides to reduce the lithium capacity, all of which is deleterious to cell performance.

It is apparent that a major problem in the fabrication of the lithium-aluminum/iron sulfide cell has been solved by the subject invention. In the past, the lithium-aluminum/iron sulfide cells had marginal loading density for high-specific-energy cells. Now however, electrodes can be formulated having loading densities of about 0.9 amp-hours/cc, well suited for a high-specific-energy cell. Further, the inventive method is capable of producing electrodes of various shapes such as cylinders, annular configurations and the like, providing a distinct advantage to presently available methods. Even materials too brittle to be cold pressed are easily fabricated by the present method and internal stresses inherent in cold pressing which result in bowing and warping in the electrode plaque or substrate are not present with the subject slurry method resulting in a dimensionally stable electrode. It is also believed that the carrier provides protection to the electrode-active material during fabrication which will allow fabrication to take place outside of the now required protective atmospheres.

It can be seen from the foregoing, that the present invention provides an improved method of fabricating electrode structure for use in electrochemical cells. The slurry method is such that it provides improved loading densities, dimensional stability and other important factors in high-specific-energy cells.

While there has been disclosed what at present is considered to be the preferred embodiment of the present invention, it will be understood that various modifications and alterations may be made therein without departing from the true spirit and scope of the present invention, and it is intended to cover within the claims appended hereto all such alterations, variations and modifications.

The embodiments of the invention in which an exclusive property or privilege is claimed are defined as follows:

1. A method of making an electrode for an electrochemical cell comprising, providing particulate electrode-active material, providing a liquid organic carrier chemically inert with respect to the electrode-active material, mixing the liquid carrier and the particulate electrode-active material to form an extrudable slurry, said liquid carrier being present in an amount of from about 10 to about 50 percent by volume of the slurry, and evaporating the carrier from the slurry leaving the electrode-active material.

2. The method of claim 1, wherein said electrode is a negative electrode containing an alkali metal or alloys thereof.

3. The method of claim 1, wherein said electrode is a positive electrode containing a chalcogen or a transition metal chalcogen.

4. The method of claim 1, wherein said carrier is a petroleum based liquid.

5. The method of claim 1, wherein said carrier is toluene, kerosene, mineral spirits or dry petroleum ether.

6. The method of claim 1, wherein said carrier is present in the range of from about 20 to about 40 percent by volume of the slurry and the particulate electrode-active material has a particle size in the range of from about +325 to about −100 U.S. Mesh Series.

7. The method of claim 1, wherein said electrode is a negative electrode containing a lithium alloy.

8. The method of claim 7, wherein said carrier is inert to lithium and is dry to provide a protective coating for the particulate lithium during formation of the lithium electrode.

9. A method of making a negative electrode for an electrochemical cell comprising providing a particulate mixture of a lithium-aluminum alloy and an electrolyte and a material selected from graphitized carbon, an aluminum-iron alloy or mixtures thereof, said lithium-aluminum alloy being present in the range of from about 45 to about 80 percent by volume of the negative electrode, said electrolyte being present in an amount not less than about 10 percent by volume of the negative electrode, said graphitized carbon being present in the range of from about 1 to about 10 percent by volume of the negative electrode, said aluminum-iron alloy being present in the range of from about 3 to about 10 percent by volume of the negative electrode, providing a liquid organic carrier chemically inert with respect to said lithium-aluminum alloy, mixing the liquid carrier and the particulate mixture to form an extrudable slurry, said liquid carrier being present in an amount of from about 10 to about 50 percent by volume of the slurry, forming said slurry into a predetermined shape, and evaporating the liquid carrier from the slurry thereby to provide a negative electrode having a predetermined shape for an electrochemical cell.

10. The method of claim 9, wherein said lithium-aluminum alloy is present in an amount not less than about 49 percent by volume of the negative electrode.

11. The method of claim 9, wherein said lithium-aluminum alloy contains lithium in the range of from about 5 to about 50 atom percent and aluminum in the range of from about 95 to about 50 atom percent.

12. The method of claim 9, wherein said electrolyte is a salt containing lithium halide.

13. The method of claim 9, wherein said electrolyte is the eutectic mixture of lithium chloride and potassium chloride.

14. The method of claim 9, wherein said graphitized carbon is produced by heating carbon powder to a temperature in the range of from about 1000° C. to about 2000° C. and is present in the range of from about 3 to about 7 percent by volume.

15. The method of claim 9, wherein said carrier is a petroleum base liquid.

16. The method of claim 9, wherein said carrier is toluene, kerosene, mineral spirits or dry petroleum ether.

17. The method of claim 9, wherein said carrier is present in the range of from about 20 to about 40 percent by volume of the slurry and the particulate mixture has a particle size in the range of from about +325 to about −100 U.S. Mesh Series.

18. The method of claim 9, wherein said carrier is inert to lithium and is dry to provide a protective coating to the particulate lithium during formation of the negative electrode.

* * * * *